US010839391B2

(12) United States Patent
Madhu et al.

(10) Patent No.: US 10,839,391 B2
(45) Date of Patent: Nov. 17, 2020

(54) METHOD AND APPARATUS FOR SECURE OFFLINE PAYMENT

(71) Applicant: Samsung Electronics Co., Ltd., Suwon-si, Gyeonggi-do (KR)

(72) Inventors: Venkata Subramanian Madhu, Bangalore (IN); Nishant Roopalwal, Bangalore (IN); Srikanth Mandalapu, Bangalore (IN); Ramanath Vishnu Pai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 16/159,065

(22) Filed: Oct. 12, 2018

(65) Prior Publication Data
US 2019/0114631 A1 Apr. 18, 2019

(30) Foreign Application Priority Data

Oct. 12, 2017 (IN) .............................. 201741036354
Oct. 5, 2018 (IN) .............................. 201741036354

(51) Int. Cl.
G06Q 20/40 (2012.01)
G06Q 20/10 (2012.01)
(Continued)

(52) U.S. Cl.
CPC ........... *G06Q 20/401* (2013.01); *G06Q 20/10* (2013.01); *G06Q 20/385* (2013.01);
(Continued)

(58) Field of Classification Search
CPC ..... G06Q 20/401; G06Q 20/10; G06Q 20/385
See application file for complete search history.

(56) References Cited

U.S. PATENT DOCUMENTS

2013/0151405 A1 6/2013 Head et al.
2014/0236842 A1* 8/2014 Salminen ............. G06Q 20/354
705/75
(Continued)

FOREIGN PATENT DOCUMENTS

EP 2 557 532 A1 2/2013
KR 10-2017-0030408 A 3/2017
(Continued)

OTHER PUBLICATIONS

Cortier et al., "Designing and proving an EMV-compliant payment protocol for mobile devices," 2017 IEEE European Symposium on Security and Privacy, IEEE Computer Society, all pages. (Year: 2017).*

(Continued)

*Primary Examiner* — Jacob C. Coppola
(74) *Attorney, Agent, or Firm* — Jefferson IP Law, LLP

(57) ABSTRACT

A method for performing a secure payment in an offline mode in an electronic device is provided. The method includes launching a secure application at the electronic device, obtaining a nonce token from an authentication unit of the electronic device, obtaining a nonce signature from a server via a network, entering an offline mode where the electronic device is disconnected from the network, encrypting, by the secure application, a user credential input by a user using the nonce token and the nonce signature, decrypting and validating, by the authentication unit, an encrypted user credential, generating a secure object based on the decrypted user credential and a random number generated by the authentication unit and performing a secure payment based on the secure object.

23 Claims, 12 Drawing Sheets

(51) Int. Cl.
  *G06Q 20/38* (2012.01)
  *H04L 9/32* (2006.01)
(52) U.S. Cl.
  CPC .......... *H04L 9/3228* (2013.01); *H04L 9/3231* (2013.01); *H04L 9/3247* (2013.01); *G06Q 2220/00* (2013.01); *H04L 2209/56* (2013.01)

(56) References Cited

U.S. PATENT DOCUMENTS

| 2014/0317686 A1* | 10/2014 | Vetillard ............... G06F 21/606 |
| | | 726/2 |
| 2015/0032627 A1 | 1/2015 | Dill et al. |
| 2015/0288694 A1 | 10/2015 | Liebl, III et al. |
| 2016/0085977 A1 | 3/2016 | Oh et al. |
| 2017/0068953 A1 | 3/2017 | Kim et al. |
| 2019/0114631 A1* | 4/2019 | Madhu ................. G06Q 20/401 |

FOREIGN PATENT DOCUMENTS

| WO | 2015/054697 A1 | 4/2015 |
| WO | 2016/137271 A1 | 9/2016 |

OTHER PUBLICATIONS

International Search Report dated Jan. 24, 2019, issued in International Application No. PCT/KR2018/012046.
Extended European Search Report dated Apr. 28, 2020, issued in European Patent Application No. 18866451.0.

\* cited by examiner

METHOD AND APPARATUS FOR SECURE OFFLINE PAYMENT

CROSS-REFERENCE TO RELATED APPLICATION(S)

This application is based on and claims priority under 35 U.S.C. § 119 of an Indian provisional application number 201741036354, filed on Oct. 12, 2017, in the Indian Patent Office, and an Indian patent application number 201741036354, filed on Oct. 5, 2018, in the Indian Patent Office, the disclosure of each of which is incorporated by reference herein in its entirety.

BACKGROUND

1. Field

The disclosure relates to a payment system. More particularly, the disclosure relates to a method and system for secure payment in an electronic device in an offline mode.

2. Description of Related Art

One form of an offline transaction is an offline payment. The offline payment includes non-electronic payment methods, such as money, check, bank draft and postal order. As technology has advanced, other payment methods have been introduced and developed. Electronic payment tools, such as stripe card, non-contact card and mobile handset, have been introduced.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for creating a secure object to perform a secure payment in an electronic device in an offline mode. The method includes launching a secure application at the electronic device, obtaining a nonce token from an authentication unit of the electronic device, obtaining a nonce signature from a server via a network, entering an offline mode where the electronic device is disconnected from the network, encrypting, by the secure application, a user credential input by a user using the nonce token and the nonce signature, decrypting and validating, by the authentication unit, an encrypted user credential, generating a secure object based on the decrypted user credential and a random number generated by the authentication unit and performing a secure payment based on the secure object.

Additional aspects will be set forth in part in the description which follows and, in part, will be apparent from the description, or may be learned by practice of the presented embodiments.

In an embodiment, the method includes validating, by the authentication unit, the nonce token and the nonce signature.

In an embodiment, the method includes launching a payment application in the offline mode of the electronic device, obtaining an one time password (OTP) of the payment application at the secure application, obtaining a second nonce token from the payment application, obtaining, by the secure application, the secure object from the authentication unit based on the second nonce token and the name of the authentication unit, wherein the performing the secure payment comprises performing the secure payment based on the secure object and the OTP.

In an embodiment, the secure object generated by the authentication unit is only viewable at the payment application.

In an embodiment, the generating the secure object comprises generating the secure object based on the user credential, the random number and a user profile available in a payment application without connecting to the server via a network, and wherein the performing the secure payment comprises generating a payment code for a payee in the electronic device and executing the payment based on the payment code input into a device of the payee.

In an embodiment, the random number remains the same when the user credential is changed.

In an embodiment, the random number is generated when the user performs a first login to the secure application.

In an embodiment, the random number is changed in response to an event comprising at least one of a factory reset event, a reset event by the user, a logout by the user, and a deletion of the secure object.

In an embodiment, the user credential comprises at least one of user-setting password, fingerprint of the user, and an iris image of the user.

In an embodiment, the validating the encrypted user credential comprises validating the user credential by comparing a user credential obtained during booting of the electronic device and a user credential stored in the electronic device.

In accordance with an aspect of the disclosure, a method for performing a secure payment in an electronic device in an offline mode is provided. The method includes initiating a secure payment transaction from a payment application in the offline mode in the electronic device. Further, the method includes obtaining by a secure application an OTP of the payment application from a user. Further, the method includes obtaining by the secure application a nonce token from the payment application indicating an authentication unit. Further, the method includes obtaining by the secure application a secure object from the authentication unit based on the nonce token obtained from the payment application. Further, the method includes performing the secure payment using the secure object and the OTP.

In accordance with another aspect of the disclosure, a method for performing a secure wallet payment in an electronic device in an offline mode is provided. The method includes initializing a payment session in a secure application installed in the electronic device. Further, the method includes receiving an authentication code from the user into the secure application in the electronic device. Further, the method includes generating a random number subsequent to the valid authentication of the code. Further, the method includes creating a secure object using the authentication code, the random number and a user profile available in the secure application without connecting to a server (i.e., application server). Further, the method includes generating a payment code (e.g., OTP, QR Code, Bar Code or the like) for a payee in the electronic device, wherein upon input of the generated payment code into the secure application installed in the payee's device, payment from the payer to the payee is executed.

In accordance with another aspect of the disclosure, an electronic device for creating a secure object to perform a secure payment in an offline mode is provided. The electronic device includes an authentication terminal embedded in a secure application. The authentication terminal is configured to obtain a user credential by the secure application and validating the user credential. The authentication unit is configured to generate a random number and create a secure object using the random number and the user credential.

In accordance with another aspect of the disclosure, an electronic device for performing secure payment in an offline mode is provided. The electronic device includes an authentication terminal embedded in a secure application. The secure application is coupled to a memory and a processor. The secure application is configured to initiate a secure payment transaction from a payment application in the offline mode in the electronic device. The secure application is configured to obtain a OTP of the payment application from a user. The secure application is configured to obtain a nonce token from the payment application indicating an authentication unit. The secure application is configured to obtain a secure object from the authentication unit based on the nonce token obtained from the payment application. The secure application is configured to perform the secure payment using the secure object and the OTP.

In accordance with another aspect of the disclosure, an electronic device for performing a secure wallet payment in an offline mode is provided. The electronic device is configured to initialize a payment session in a secure application. Further, the electronic device is configured to receive an authentication code from the user into a secure payment application. The electronic device is configured to generate a random number subsequent to the valid authentication of the code. The electronic device is configured to create a secure object using the authentication code, the random number and a user profile available in the secure payment application without connecting to an application server. The electronic device is configured to generate a payment code for a payee in the electronic device, where upon input of the generated payment code into the secure payment application installed in the payee's device, payment from the payer to the payee is executed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
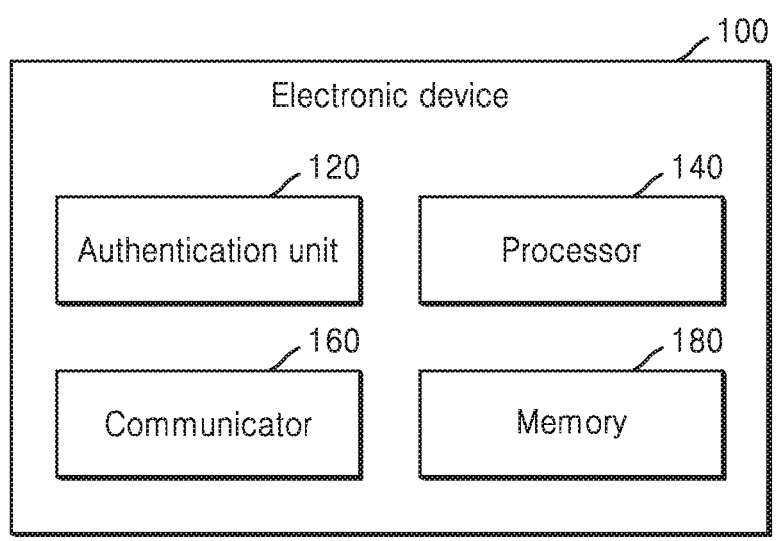
FIG. 1 illustrates a block diagram of an electronic device for performing a secure payment in an offline mode, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Referring now to the drawings, and more particularly to FIGS. 1 through 12, where similar reference characters denote corresponding features consistently throughout the figures, there are shown preferred embodiments.

Offline payment applications are possible in an electronic device with real time kernel protection and a trusted user interface. Further, there are no solutions in the existing methods to equally provide a secure offline payment in the electronic device without relying on a server.

Embodiments herein disclose an electronic device for performing secure payment in an offline mode. Throughout the disclosure, the offline mode may indicate a mode where the electronic device performs the secure payment without connecting to or relying on a server or other devices for the electronic transaction. The electronic device may include an authentication unit and a processor. The electronic device may execute a secure application for performing the secure transaction. The secure application is configured to initiate a secure payment transaction from a payment application in the electronic device in the offline mode. The processor is configured to obtain an OTP of the payment application from a user and a nonce token from the payment application. The processor is further configured to obtain a secure object from the authentication unit based on the nonce token obtained from the payment application. The processor is configured to perform the secure payment using the secure object and the OTP.

The proposed disclosure can be used to perform the secure payment in the electronic device in an offline mode without relying on a server/network. In the proposed methods, the method can be used to allow bank-to-bank or wallet-to-wallet payments.

In the proposed disclosure, the more number of first time retries are blocked by the server. After the first time validation of the nonce, the user entered personal identification number (PIN) state (e.g. retry count) can be completely managed in the memory of the electronic device. Further, any more invalid number of retries can be managed by the device and this helps us to support offline mode payments without relying on the server or the network.

Referring to the drawings, and more particularly to FIGS. 1 through 12, there are shown preferred embodiments.

FIG. 1 illustrates a block diagram of an electronic device for performing a secure payment in an offline mode, according to an embodiment of the disclosure.

Referring to FIG. 1, the electronic device 100 can be, for example, but not limited to a smart phone, a smart watch, a tablet, a laptop computer, a personal digital assistance (PDA), or the like. In an embodiment, the electronic device 100 may include an authentication unit 120, a processor 140, a communicator 160, and a memory 180. The processor 140 may be used to execute a secure application embedded in the processor memory or stored in the memory 180 and the secure application may support an offline payment in the electronic device 100. The processor may also be used to execute a payment application which is embedded in the processor memory or stored in the memory 180. The payment application may be a mobile wallet application or the like. The secure payment can be a secure wallet payment. The communicator 160 may be used to communicate by establishing a wired or wireless network connection between the electronic device 100 and a server (not shown) or other electronic devices. The authentication unit 120 and the communicator 160 may be implemented in at least one hardware processor such as the processor 140.

In an embodiment, the authentication unit 120 may be embedded in the secure application as software module. The authentication unit 120 is configured to obtain a user credential (e.g., password, PIN, fingerprint, iris image or the like) by the secure application and validate the user credential. The authentication unit 120 is configured to generate a random number and create a secure object using the random number and the user credential.

In an embodiment, the random number remains same while performing the secure transaction in the electronic device 100 in the offline mode. In an embodiment, the random number remains same when the user credential is changed.

In an embodiment, the random number is generated at a first login of the secure application. In an embodiment, the random number is changed at an event, wherein the event can be, for example, but not limited to a factory reset event, a logout event, a reset event by the user of the electronic device 100, and deletion of the secure object.

The processor 140 is configured to store the secure object in the memory 180. The memory 180 can be a secure memory as a part of the memory 180 for storing confidential information for secure transaction.

Further, the user of the electronic device 100 may initiate a secure payment transaction from the payment application in the offline mode. Based on the initiating the secure payment transaction, the secure application obtains a user credential such as one time password (OTP) of the payment application from the user. Further, the processor 140 is configured to obtain a nonce token from the payment application, wherein the nonce token indicates the authentication unit 120. The processor 140 may obtain the secure object from the authentication unit 120 based on the nonce token obtained from the payment application. Further, the processor 140 performs a secure payment using the secure application based on the secure object and the user credential such as the OTP.

In an embodiment, the processor 140 is configured to validate the user credential by comparing the user credential obtained during the booting of the electronic device 100 and the user credential stored in the electronic device 100. The processor is configured to obtain the nonce token from the authentication unit 120, obtain the nonce signature from a server (e.g. application server or the like), validate the user credential using the nonce token, and encrypt the user credential using the nonce token and the nonce signature.

In an embodiment, the user credential is validated by verifying the user credential using the nonce signature and an encrypted user credential comprising the nonce token, validating the nonce token and the nonce signature and decrypting the encrypted user credential.

In an embodiment, the user credential is changed by decrypting and validating the user credential using the nonce token, setting a change state of the user credential (e.g. PIN or the like), obtaining the nonce token after receiving another user credential, and changing another user credential using the nonce token.

The processor 140 is configured to execute instructions stored in the memory 180 and to perform various processes. The communicator 160 is configured for communicating internally between internal hardware components and with external devices via one or more networks.

The memory 180 also stores instructions to be executed by the processor 140. The memory 180 may include non-volatile memory. Examples of such non-volatile memory may include magnetic hard discs, optical discs, floppy discs, flash memories, or forms of electrically programmable read-only memories (EPROM) or electrically erasable and programmable ROM (EEPROM). In addition, the memory 180 may, in some examples, be considered a non-transitory storage medium. The term "non-transitory" may indicate that the storage medium is not embodied in a carrier wave or a propagated signal. However, the term "non-transitory" should not be interpreted that the memory 180 is non-movable. In some examples, the memory 180 can be configured to store larger amounts of information than the memory. In certain examples, a non-transitory storage medium may store data that can, over time, change (e.g., in random access memory (RAM) or cache).

The proposed method can be used to provide the offline payment transactions using the authentication unit 120 of the electronic device 100 which stores all the authentication information of the user and further validates the authentication. For example, when the user accesses the payment application in an offline, the user can input the PIN or a password for authentication. Further, the authentication unit 120 can compare the received PIN or the password with the previously stored PIN or the password. If the PIN or the password is matched with the previously stored PIN or the password, then the user authentication is determined to be successful and the payment transaction is proceeded.

Although the FIG. 1 shows various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components can be combined together to perform same or substantially similar function to perform the secure payment in the electronic device 100 in the offline mode.

Figure 2:
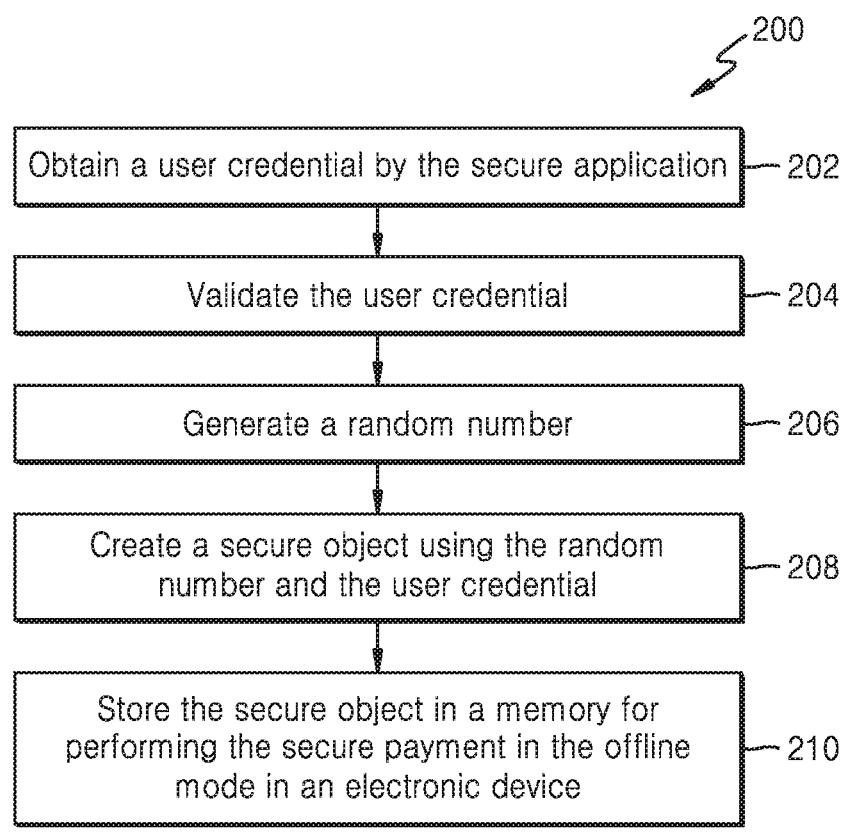
FIG. 2 illustrates a flow diagram of a method for creating a secure object to perform a secure payment in an electronic device in an offline mode, according to an embodiment of the disclosure.

FIG. 2 illustrates a flow diagram of a method for creating a secure object to perform a secure payment in an electronic device in an offline mode, according to an embodiment of the disclosure.

Referring to FIG. 2, in operation 202 of a method 200, the processor 140 obtains a user credential by a secure application. In operation 204, the processor 140 may validate the user credential by, for example, comparing the obtained user credential with a user credential previously stored in the memory 180. The user credential may be used in various forms such as a user-setting password, fingerprint of the user, iris image of the user, etc. In operation 206, the processor may generate a random number. In an embodiment, the random number may be generated while the user logs on to the secure application for the first time. In operation 208, the processor 140 may generate a secure object using the random number and the user credential. In operation 210, the processor 140 may store the secure object in the memory 180 for performing the secure payment in an offline mode.

The various actions, acts, blocks, operations, or the like in the flow diagram 200 may be performed in the order presented, in a different order or simultaneously. Further, in some embodiments, some of the actions, acts, blocks, operations, or the like may be omitted, added, modified, skipped, or the like without departing from the scope of the disclosure.

Figure 3:
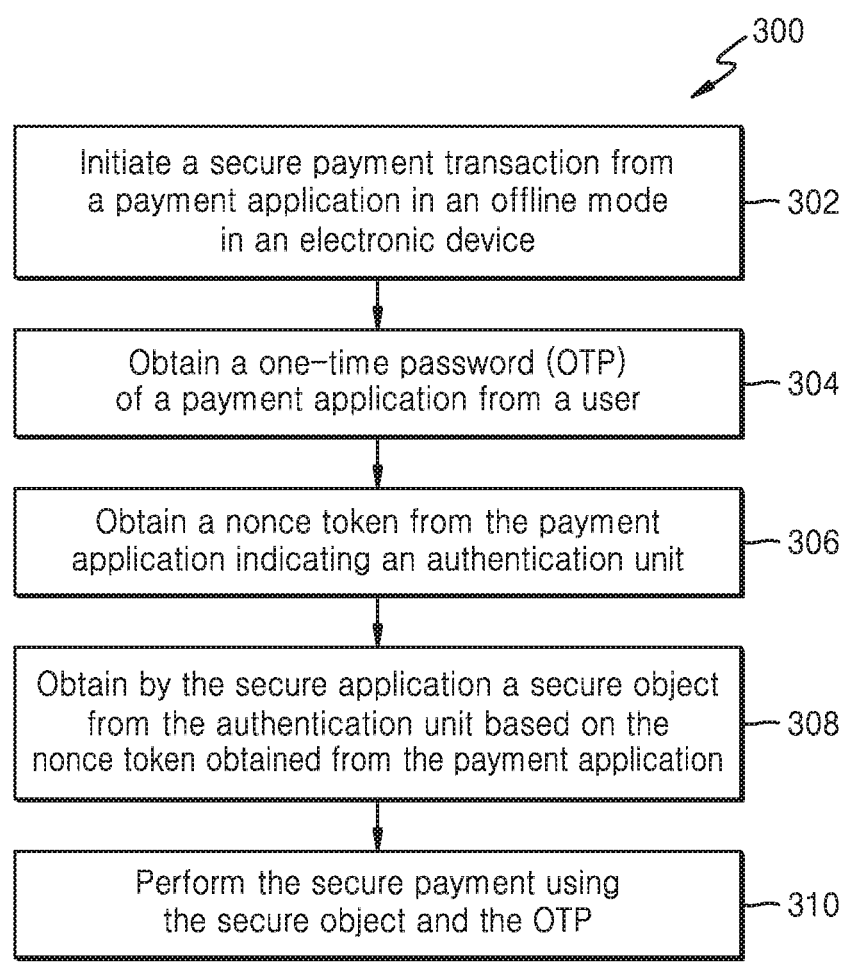
FIG. 3 illustrates a flow diagram of a method for performing a secure payment in an electronic device in an offline mode, according to an embodiment of the disclosure.

FIG. 3 illustrates a flow diagram of a method for performing a secure payment in an electronic device in an offline mode, according to an embodiment of the disclosure.

Referring to FIG. 3, in operation 302 of a method 300, the processor may initiate a secure payment transaction by executing or launching the payment application in the offline mode in the electronic device 100. In operation 304, the processor 140 obtains an OTP of the payment application from the user at the secure application. In operation 306, the processor 140 obtains a nonce token from the payment application. The nonce token indicates the authentication unit 120. In operation 308, the processor 140 may obtain a secure object from the authentication unit 120 based on the nonce token obtained from the payment application. In operation 310, the processor 140 may perform a secure payment using the secure object and the OTP.

The various actions, acts, blocks, operations, or the like in the flow diagram 300 may be performed in the order presented, in a different order or simultaneously. Further, in some embodiments, some of the actions, acts, blocks, operations, or the like may be omitted, added, modified, skipped, or the like without departing from the scope of the disclosure.

Figure 4:
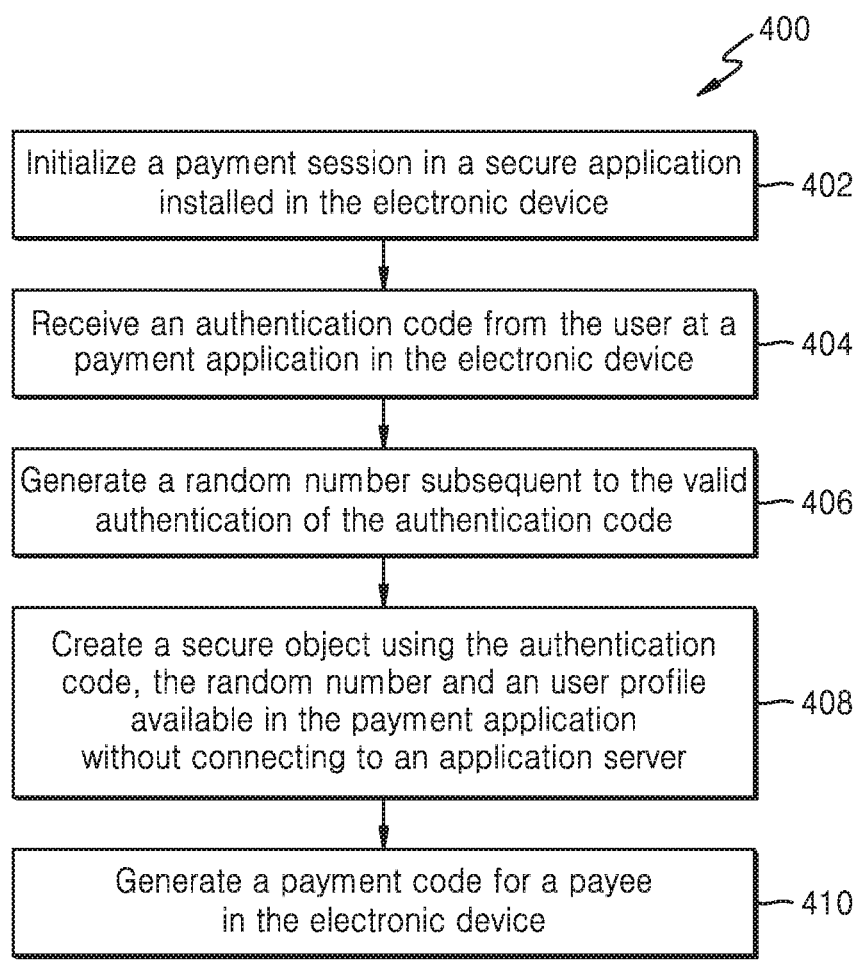
FIG. 4 illustrates a flow diagram of a method for performing a secure wallet payment in an offline mode in an electronic device, according to an embodiment of the disclosure.

FIG. 4 illustrates a flow diagram of a method for performing a secure wallet payment in an offline mode in an electronic device, according to an embodiment of the disclosure.

Referring to FIG. 4, in operation 402 of a method 400, the method includes initializing a payment session in a secure application. In operation 404, the method includes receiving an authentication code (or interchangeably, a user credential) from the user at a payment application. In operation 406, the method includes generating a random number subsequent to the valid authentication of the authentication code. In operation 408, the method includes creating a secure object using the authentication code, the random number and a user profile available in the payment application without connecting to a server (e.g., application server). In operation 410, the method includes generating the payment code for a payee in the electronic device 100, wherein upon input of the generated payment code into the secure payment application installed in the payee's device, the payment from the payer to the payee is executed. In another embodiment, the payment application can be the secure application.

The various actions, acts, blocks, operations, or the like in the flow diagram 400 may be performed in the order presented, in a different order or simultaneously. Further, in some embodiments, some of the actions, acts, blocks, operations, or the like may be omitted, added, modified, skipped, or the like without departing from the scope of the disclosure.

Figure 5:
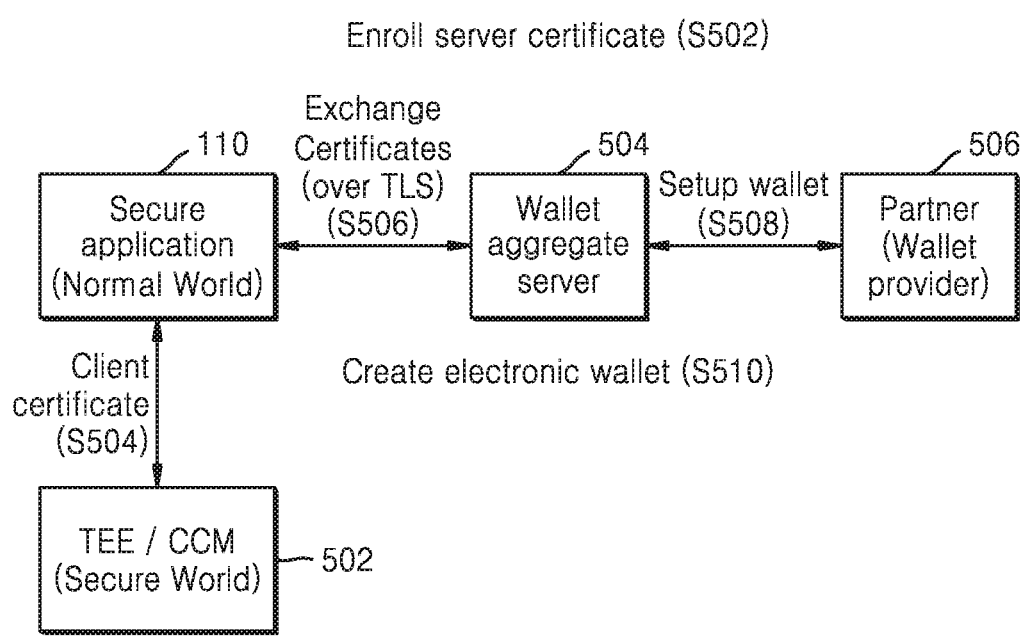
FIG. 5 illustrates a sequence diagram illustrating various operations for enrolling for establishing a secure communication channel, according to an embodiment of the disclosure.

FIG. 5 illustrates a sequence diagram illustrating various operations for enrolling for establishing a secure communication channel, according to an embodiment of the disclosure.

Referring to FIG. 5, in order to enroll for establishing a secure communication channel, a wallet aggregate server 504 enrolls for server certificate in operation S502. A trust execution environment (TEE)/cloud control matrix (CCM) 502 provides (S504) a client certificate to the secure application 110 (S504). Then, the payment application exchanges certificates with a wallet aggregate server 504 (S506). The wallet aggregate server 504 setups an electronic wallet (S508) for a wallet provider 506. The wallet aggregate server 504 creates the electronic wallet (S510).

Figure 6:
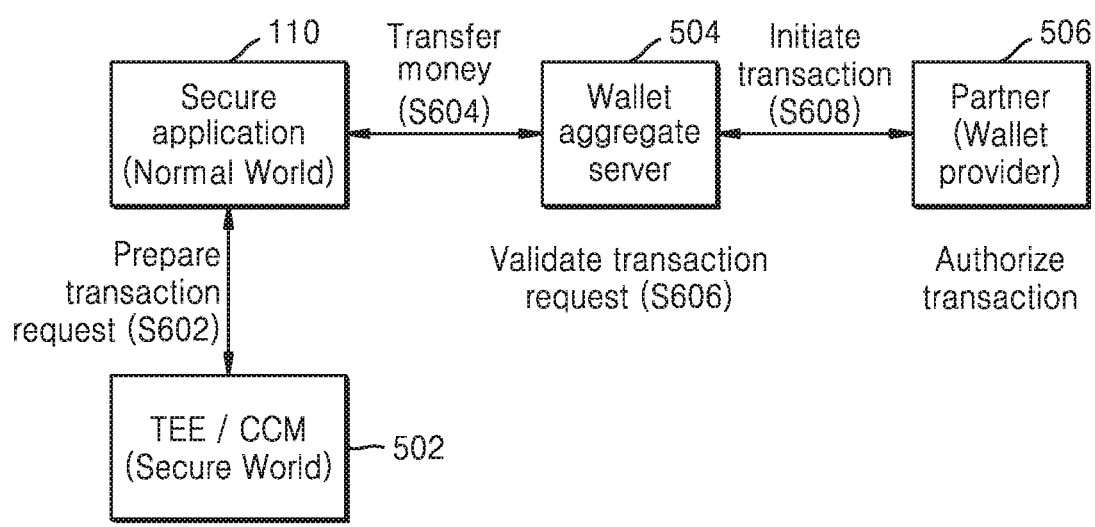
FIG. 6 illustrates a sequence diagram illustrating various operations for leveraging a secure communication channel, according to an embodiment of the disclosure.

FIG. 6 illustrates a sequence diagram illustrating various operations for leveraging a secure communication channel, according to an embodiment of the disclosure.

Referring to FIG. 6, the TEE/CCM 502 provides a transmission request to the payment application (S602). The secure application 110 transfers an amount (e.g., money or the like) to the wallet aggregate server 504 (S604). The wallet aggregate server 504 validates a transmission request (S606) and initiates the transactions to the wallet provider 506 (S608).

The normal world is where non-secure application (e.g., camera application, video application or the like) and data processing takes place. The secure world is reserved for storage and computing of sensitive (encrypted) data and the associated cryptographic keys. The applications that run in the secure world are called trusted application(s) (TAs). Multiple TAs comprise a payment architecture, such as those responsible for communications with the payment networks, run inside the TEE. There are others as well, including the TAs that handle user authentication managing data encryption and authentication keys for the payment framework. For user authentication, trusted drivers operating in the TEE control access to a fingerprint sensor and a touch sensor for a Trusted PIN Pad. These drivers only allow authentication information to be passed directly to the respective payment network trusted application inside the TEE.

Further, a trust zone hardware effectively partitions memory and central processing unit (CPU) resources into a "secure" and a "non-secure" area. A security technology called trustzone based integrity measurement architecture (TIMA), running in a secure system, uses the trustzone hardware to continuously monitor the integrity of an operating system (e.g., Linux kernel). Along with secure boot and security enhancements for android, TIMA forms the first line of defense against malicious attacks on the kernel and core bootstrap processes. If kernel or boot loader integrity violations are detected, the TIMA takes a policy-driven action in response, one of which is to disable the kernel and restart the device to a known good state, thereby safeguarding all TIMA-dependent features within the TEE, including Samsung Pay and the Samsung KNOX Workspace, from device-level attacks.

Whenever the TA is loaded into the memory 180, the TEE/CCM 502 performs cryptographic verification of the binary—the application's executable program to further ensure that only authentic payment TAs are executed and allowed to access payment credentials. This check is performed in addition to the initial verification performed when the secure application is first installed on the electronic device 100.

Further, the transaction specific fields (e.g., wallet access token) are encrypted/stored in the secure application. The pay client (e.g., TIMA/CCM) exchanges certificates with the wallet aggregate server 504 and sensitive cryptographic operations are completed in the TEE. The wallet aggregate server 504 may run in isolated Linux containers and wallet data is isolated to different Couch-base server buckets. Few personally identifiable fields (Ex: transaction) are stored in the wallet aggregate server 504 and personally identifiable fields are encrypted with key management service. The user authentication is managed with the authentication unit 120 in the TEE and a server signature to ensure trust in the absence of trusted user interface (TUI).

Figure 7:
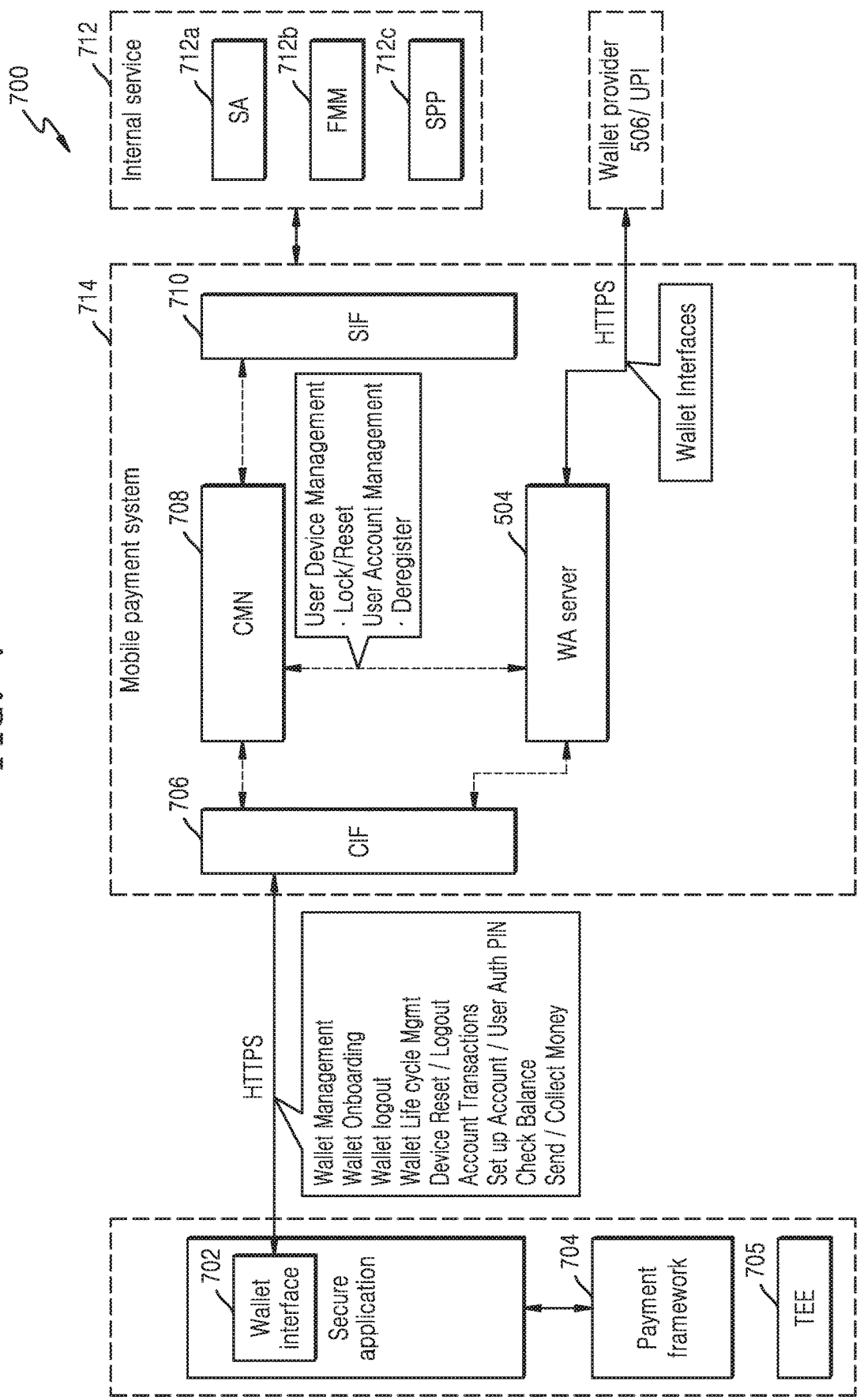
FIG. 7 illustrates a block diagram of a wallet aggregator architecture, according to an embodiment of the disclosure.

FIG. 7 illustrates a block diagram of a wallet aggregator architecture, according to an embodiment of the disclosure.

Referring to FIG. 7, a wallet aggregator architecture 700 includes a wallet interface 702, a payment framework 704, the TEE 705, a Mobile Payment System 714, an Internal Service 712, the wallet aggregate (WA) server 504, a service-request information field (SIF) 710, a common interface (CIF) 706 and the wallet provider 506. The secure application communicates with the CIF 706 through the wallet interface 702. Further, the secure application communicates with the payment framework 704. The SIF 710 includes information relating to the electronic device 100.

Further, the Mobile Payment System 714 includes the CMN 708, the CIF 706 and the WA server 504. The CMN 708 manages the account registration/deregistration. Further, the CMN 708 arranges a JSON Web Token (JWT) to the secure application which is used for subsequent interaction with the Mobile Payment System 714. The JWT is first validated before handing over the request to the WA server 504. Further, the CMN 708 handles the wallet life cycle management for a device lock operation, a device unlock operation, a secure application details reset operation, a secure application details clear operation, an account deregistration operation, and an account deletion operation.

Further, the CIF 706 receives all the requests from the secure application. The requests received from the client are first sent to the CMN 708 to validate JWT. After successful validation, the CIF 706 may hand over the request to the WA server 504. The WA server 504 interacts with multiple wallet providers 506 and is responsible for wallet data provisioning and transaction. In an embodiment, the internal service 712 includes a Samsung Account (SA) 712a, a Find My Mobile (FMM) 712b, and a Samsung Push Protocol (SPP) 712c for managing the payments transaction.

Figure 8:
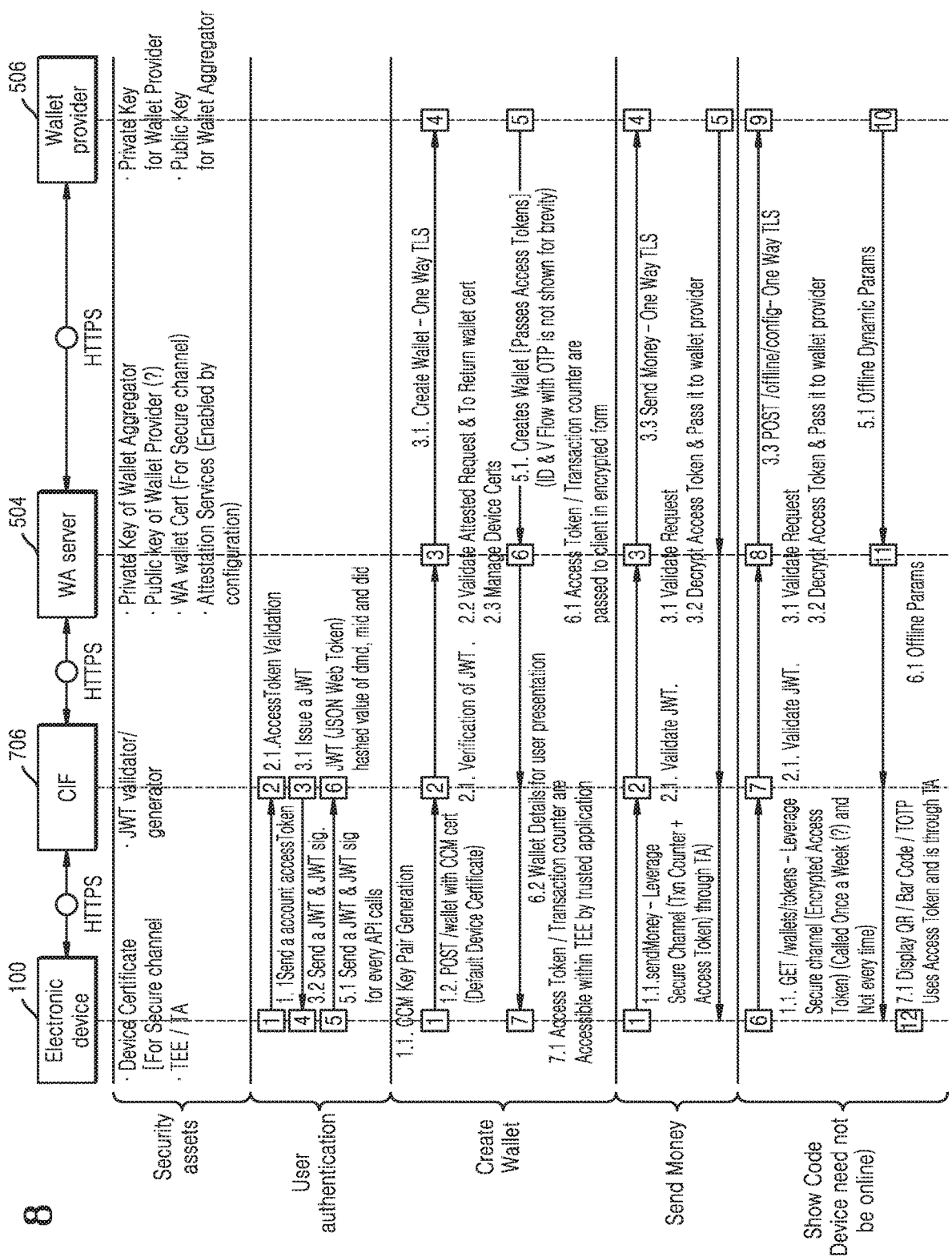
FIG. 8 illustrates a sequence diagram illustrating various operations for performing an offline payment in an electronic device, according to an embodiment of the disclosure.

FIG. 8 illustrates a sequence diagram illustrating various operations for performing an offline payment in an electronic device, according to an embodiment of the disclosure.

The following procedures are involved in the offline payment procedures (such as security asset procedure, a user authentication procedure, a wallet creation procedure, and a money sending procedure in offline mode).

Referring to FIG. 8, the user authentication procedure is performed after the security asset procedure. In the user authentication procedure, the secure application installed in the electronic device 100 sends account access token information to the CIF 706 in operation 1 of the user authentication procedure. In operation 2 of the user authentication procedure, the CIF 706 validates the account access token information and the CIF 706 issues the JWT in operation 3. In operation 4, the CIF 706 sends the JWT and a JWT signature to the secure application. The secure application sends the JWT and JWT signature for every application in operation 5. In operation 6, the CIF 706 creates a hashed value of derived master identifier (dmd), master identifier (mid) and device identifier (did) based on the JWT.

Following procedures are involved in the wallet creation. The secure application in the electronic device 100 creates the electronic wallet based on a client certificate manager (CCM) key pair generation in the electronic device 100 in operation 1 of the wallet creation procedure. The electronic device 100 sends the electronic wallet with CCM certificate to the CIF 706. The verification of JWT is taking place at the CIF 706 in operation 2. The wallet aggregate server 504 validates an attested request and provides the payment certificate in operation 3. In operation 4, the wallet aggregate server 504 creates the electronic wallet through TLS (one way or two-way). The wallet aggregate server 504 manages the device certificate. The wallet provider 506 creates the electronic wallet. The wallet provider 506 sends wallet information to the wallet aggregate server 504 in operation 5 and 6. The wallet aggregate server 504 sends the wallet details to the electronic device 100 in operation 7. The access token/transaction counter are accessible within the Trusted Execution Environment (TEE) 503 by the secure application of the electronic device 100.

Referring to FIG. 8, following procedures are involved in the money sending procedure in an offline mode of the electronic device 100. The electronic device 100 sends money over a leverage secure channel in operation 1. The CIF 706 validates the JWT, validates the request, decrypts the access token and passes it to the wallet aggregate sever 504, in operation 2 and 3. The wallet aggregate server 504 sends money over the one way TLS to the wallet provider 506 in operation 4 and 5. Operations 6 through 12 relate to show code (device operation not in online mode but in offline mode) procedure. In operation 6, the electronic device 100 obtains the encrypted access token over the leverage secure channel. In operation 7, the CIF 706 validates JWT. In operation 8, the wallet aggregate server 504 validates the request, decrypts access token and passes the decrypted access token to the wallet provider 506 over the one way TLS. In operation 10, the wallet provider 506 sends the offline dynamic parameter to the wallet aggregate server 504. In operation 11, the wallet aggregate server 504 sends the offline parameter to the CIF 706. In operation 12, the electronic device 100 receives the OTP/authentication code (e.g., QR code, bar code or the like) to complete the transaction.

Figure 9:
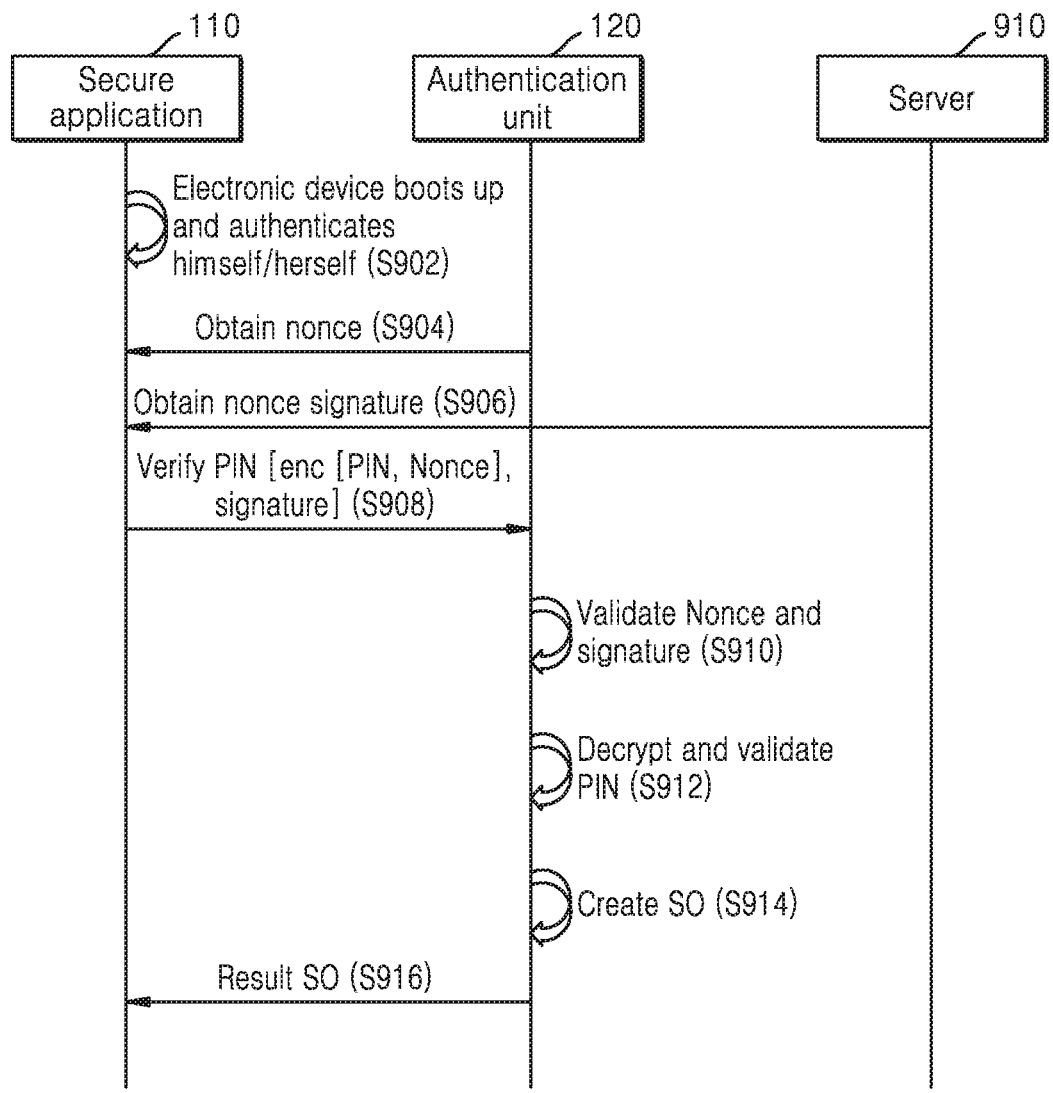
FIG. 9 illustrates a sequence diagram illustrating various operations for a user authentication procedure in an electronic device, according to an embodiment of the disclosure.

FIG. 9 illustrates a sequence diagram illustrating various operations for a user authentication procedure in the electronic device 100, according to an embodiment of the disclosure.

Referring to FIG. 9, in operation S902, when the user accesses the electronic device 100 to make the payment transaction, the electronic device 100 authenticates the secure application by obtaining a user credential such as fingerprint, iris image, PIN or password. Further, the secure application may store the user credential.

In operation S904, the secure application may obtain a nonce or a nonce token from the authentication unit 120. The nonce termed as nonce token is a random data generated in authentication unit 120. In operation S906, the secure application receives the nonce signature from the authentication unit 120 or the server 910. The authentication unit 120 or the server 910 may sign the nonce token to generate the nonce signature. The nonce signature received by the secure application 110 from the authentication unit 120 may be used to verify the authentication unit 120. If the nonce signature transmitted from the server 910 to the authentication unit 120 through the secure application 110 may be used to verify the server 910. Once the electronic device 100 receives the nonce signature from the server in an online mode in which the electronic device connects to the server 910 via a network, the electronic device 100 enters an offline mode where the electronic device is disconnected from the network.

In operation S908, the authentication unit 120 may verify both of the nonce token and the nonce signature together. In operation S910, the authentication unit 120 validates the nonce token and the nonce signature. In operation S912, the authentication unit 120 decrypts the encrypted user credential. In operation S914, the authentication unit 120 may create a security object (SO) and send the SO to the secure application in operation S916.

Referring to FIG. 9, the electronic device 100 operates in an offline mode in which the electronic device 100 is disconnected from the network except when the electronic device 100 obtains a nonce signature from the server 910. After the initial booting up process of the electronic device 100 and a validation of the user authentication, the authentication unit 120 may manage the retry count in secure memory of the electronic device 100 without relying on the server 910.

The electronic device 100 has to be online only for the first time during the booting up of the electronic device 100. The electronic device 100 may obtain the nonce signature from the server in an online mode in which the electronic device 100 connected to a network. Further, any privilege escalated user in the electronic device 100 having complete control over the electronic device 100 cannot do any programmatic brute force PIN attacks as the nonce signature is needed from the server.

Further, the more number of first time retries are blocked by the server. In other words, the server is restricted to send the nonce signature only predetermined times. For example, the electronic device 100 may send at most 10 requests for the nonce signature in 24 hours.

After the first time validation of the nonce, the user entered PIN state (e.g. retry count) can be completely managed in the secure memory of the electronic device 100. Further, any more invalid number of retries can be managed by the device and this helps us to support offline device payments without relying on the server.

Figure 10:
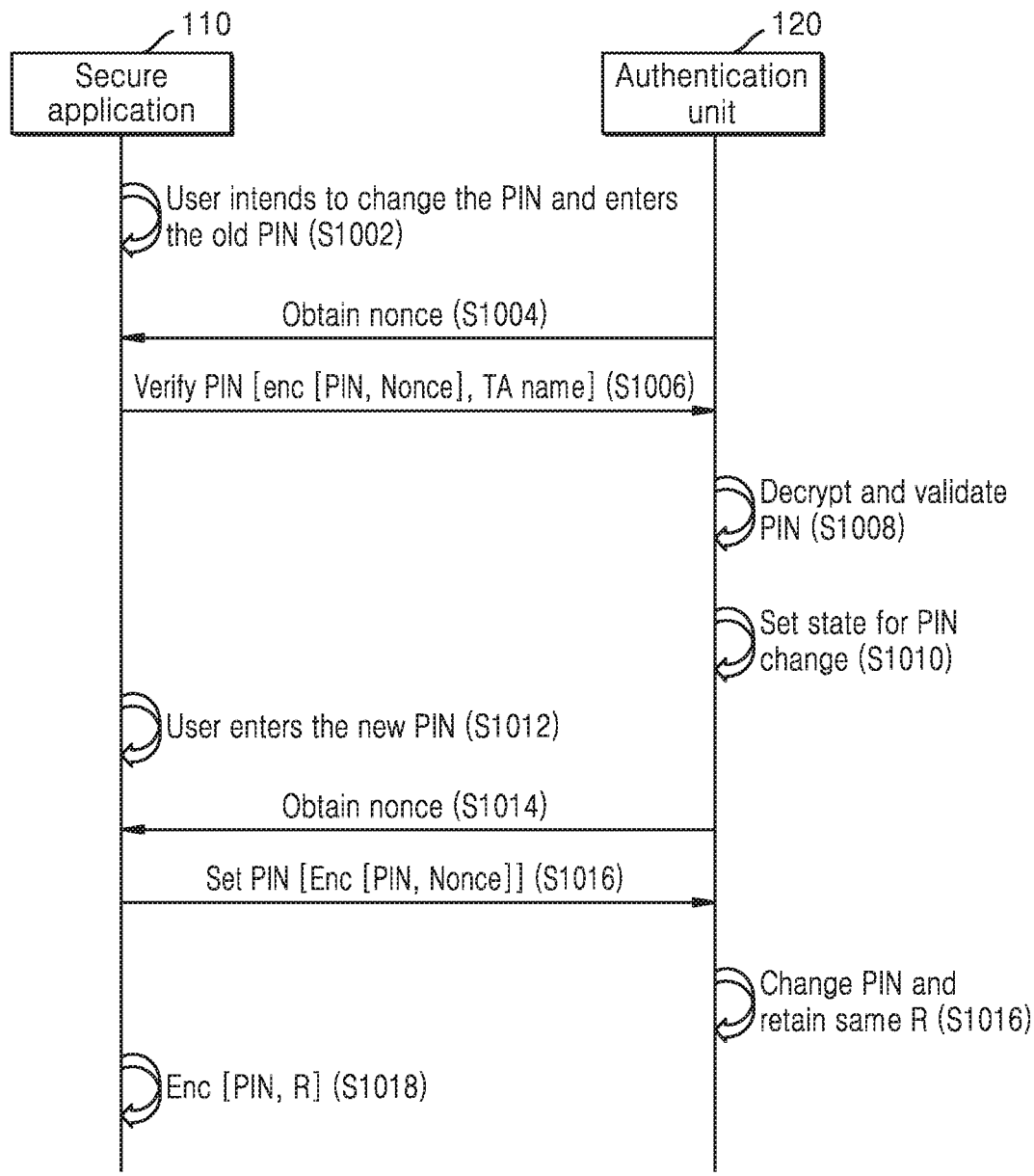
FIG. 10 illustrates a sequence diagram illustrating various operations of modifying a user authentication information, according to an embodiment of the disclosure.

FIG. 10 illustrates a sequence diagram illustrating various operations for modifying a user authentication information which is stored by an authentication unit, according to an embodiment of the disclosure.

Referring to FIG. 10, in operation S1002, the user intends to change the PIN and enters the old PIN. In operation S1004, the secure application 110 obtains a nonce (nonce token) from the authentication unit 120. Further, the secure application 110 stores the user authentication information. In operation S1006, the authentication unit 120 verifies the authentication information provided by the user (i.e., verifies the user credential using the nonce signature, the encrypted user credential comprising the nonce token and/or the name of the trusted application such as the authentication unit 120). In operation S1008, the authentication unit 120 validates and decrypts the encrypted user credential. In operation S1010, the authentication unit 120 sets a change state of the user credential.

In operation S1012, the secure application 110 obtains a new user credential input by the user. In operation S1014, the secure application 110 obtains the nonce token. In operation S1016, the secure application 110 sends the new user credential with the nonce token to the authentication unit 120. In operation S1016, the authentication unit 120 updates the user credential using the nonce token, but the random number remains same even when the user credential is changed. In operation S1018, the secure application 110 stores secured user credential by encrypting the user credential with the random number.

Figure 11:
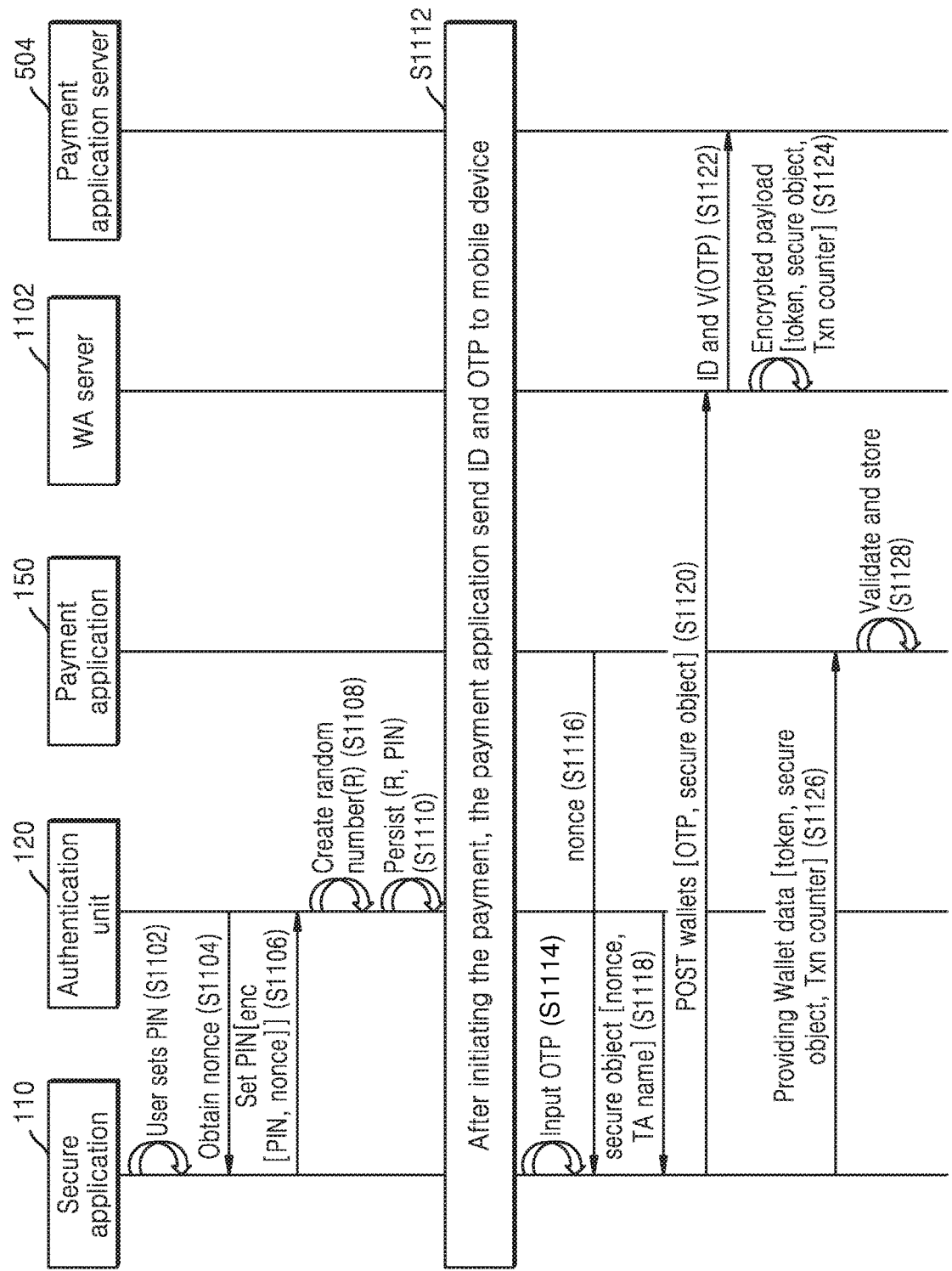
FIG. 11 illustrates a sequence diagram illustrating various operations for performing a payment in an offline mode, according to an embodiment of the disclosure.

FIG. 11 illustrates a sequence diagram illustrating various operations for performing a payment in an offline mode, according to an embodiment of the disclosure.

Referring to FIG. 11, in operation S1102, the user of the electronic device 100 sets the user credential (i.e., PIN, fingerprint, iris image, etc.) in the secure application 110. In operation S1104, the secure application 110 obtains a nonce from the authentication unit 120. In operation S1106, the secure application 110 configures a secured user credential by encrypting the PIN with the nonce. The encrypted PIN with the nonce is transmitted to the authentication unit 120.

In operation S1108, the authentication unit 120 generates a random number (R). The random number is generated at the first login of the secure application 110 and the random number remains same even when the user credential is changed.

In operation S1110, the authentication unit 120 may persist or maintain the random number and the secured user credential including the encrypted user credential with the nonce. In operation S1112, the payment application 150 sends an identifier (ID) and an OTP to the electronic device 100 after initiating the payment.

In operation S1114, the secure application 110 obtains the OTP from the user. In operation S1114, the secure application 110 obtains a nonce from the payment application 150. The authentication unit 120 adds the random number and the nonce within a secure object. The secure object can be only viewed by the payment application 150. In operation S1116, the secure application 110 obtains the secure object from the authentication unit 120 based on the nonce and the name of TA (S1118).

In operation S1120, the secure application 110 sends a POST wallets message including the OTP and the secure object to a wallet aggregate (WA) server 1102. In operation S1122, the WA server 1102 transmits the identifier (ID) and virtual OTP (V(OTP)) to a payment application server. In operation S1124, the WA server 1102 generates the encrypted payload including the nonce token, the secure object, and the transaction counter.

In operation S1126, the secure application 110 transmits a wallet data including the token, the secure object, and the transaction counter to the payment application 150. In operation S1128, the payment application 150 validates and stores the transmitted wallet data.

Further, the secure object with the random number "R" is passed as part of ID & V(OTP) response from the WA server 1102 to the payment application 150.

Figure 12:
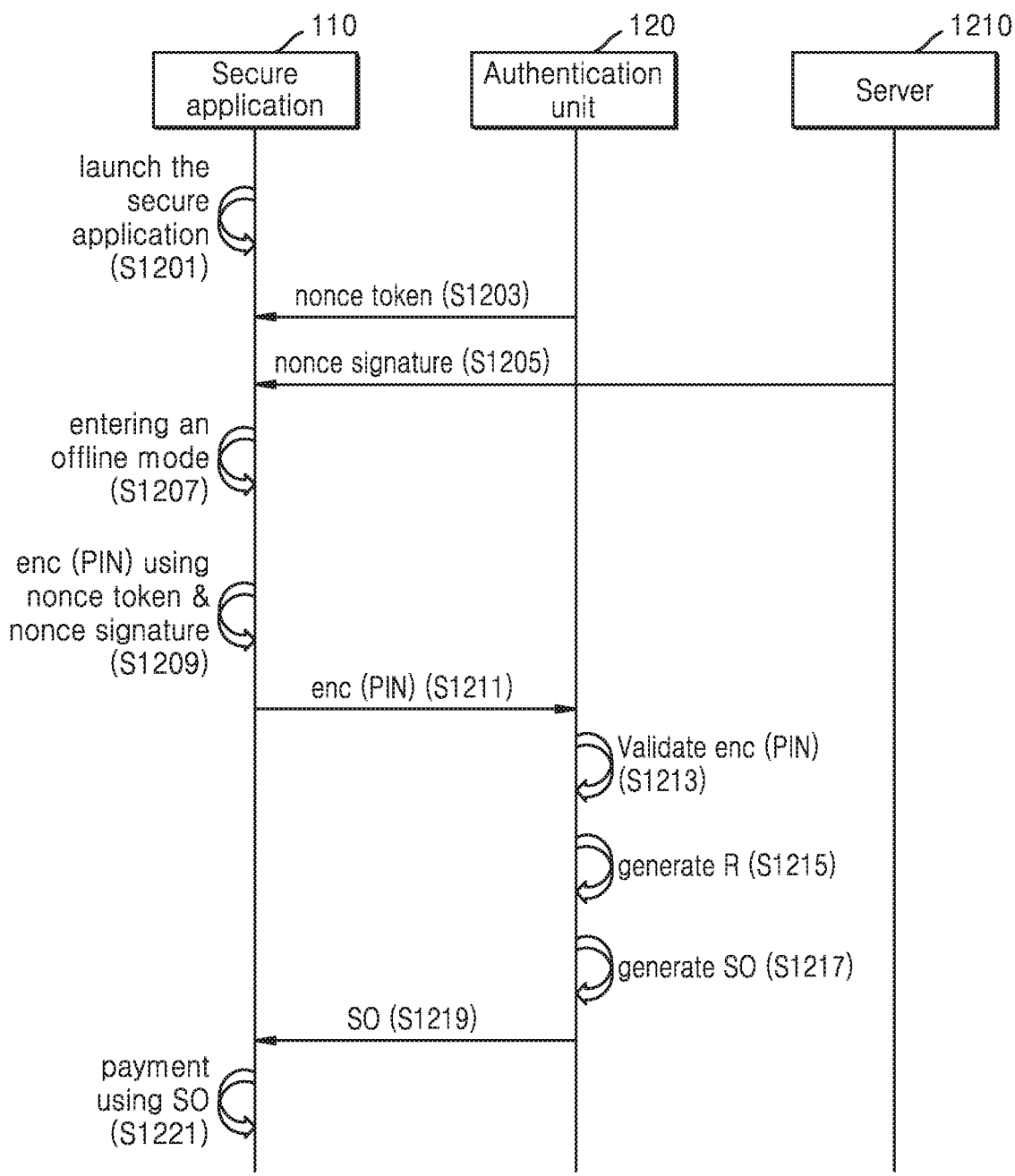
FIG. 12 illustrates a sequence diagram illustrating operations for performing a secure payment in an offline mode, according to an embodiment of the disclosure.

FIG. 12 illustrates a sequence diagram illustrating operations for performing a secure payment in an offline mode, according to an embodiment of the disclosure.

Referring to FIG. 12, in operation S1201, the electronic device 100 launches or executes a secure application 110 for performing a secure payment in an offline mode. In operation S1203, the secure application 110 obtains a nonce token from an authentication unit 120 of the electronic device 100. In operation S1205, the secure application 110 obtains a nonce signature from a server 1210 in an online mode where the electronic device 100 is connected to the server 1210 via a wired or wireless network.

In operation S1207, the secure application 110 may enter an offline mode where the electronic device 100 is disconnected from the wired or wireless network. The electronic device 100 may enter the offline mode in situation where the network connection is unstable, network service is unavailable, the electronic device 100 needs to save power consumption due to a battery shortage, or the electronic device 100 is incapable of connecting to a network service in certain area for any reason.

In operation S1209, the secure application 110 encrypt a user credential received from a user of the electronic device 100 using the nonce token and the nonce signature. In operation S1211, the encrypted user credential is transmitted to the authentication unit 120 for further processing. In operation S1213, the authentication unit 120 may decrypt and validate the encrypted user credential.

In operation S1215 and S1217, the authentication unit 120 generates a random number and generates a secure object based on the decrypted user credential and the random number. In operation S1219, the authentication unit 120 transmits the secure object to the secure application 110 for the secure payment. The secure payment is performed using the secure object in operation S1221.

The embodiments disclosed herein can be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing a payment in an offline mode of an electronic device, the method comprising:
   launching, by the electronic device, a secure application;
   obtaining a nonce token from an authenticator of the electronic device;
   obtaining, via a network, a nonce signature generated based on the nonce token signed by a server;
   encrypting, by the secure application, a user credential input by a user using the nonce token and the nonce signature while diconnected from the network;
   decrypting and validating, by the authenticator, the encrypted user credential;
   generating a secure object based on the decrypted user credential and a random number generated by the authenticator; and
   performing, while disconnected from the network, a secure payment based on the secure object.

2. The method of claim 1, further comprising:
   validating, by the authenticator, the nonce token and the nonce signature.

3. The method of claim 1, further comprising:
   launching a payment application in the offline mode of the electronic device;
   obtaining an one time password (OTP) of the payment application at the secure application;
   obtaining a second nonce token from the payment application; and
   obtaining, by the secure application, the secure object from the authenticator based on the second nonce token and a name of the authenticator,
   wherein the performing of the secure payment comprises performing the secure payment based on the secure object and the OTP.

4. The method of claim 3, wherein the secure object generated by the authenticator is only viewable at the payment application.

5. The method of claim 1,
wherein the generating of the secure object comprises:
generating the secure object based on the user credential, the random number and a user profile available in a payment application without connecting to the server via the network, and
wherein the performing of the secure payment comprises:
generating a payment code for a payee in the electronic device, and
executing the payment based on the payment code input into a device of the payee.

6. The method of claim 1, wherein the random number remains the same when the user credential is changed.

7. The method of claim 1, wherein the random number is generated when the user performs a first login to the secure application.

8. The method of claim 1, wherein the random number is changed in response to an event comprising at least one of a factory reset event, a reset event by the user, a logout by the user, or a deletion of the secure object.

9. The method of claim 1, wherein the user credential comprises at least one of user-setting password, fingerprint of the user, or an iris image of the user.

10. The method of claim 1, wherein the validating of the encrypted user credential comprises:
validating the user credential by comparing a user credential obtained during booting of the electronic device and a user credential stored in the electronic device.

11. The method of claim 1, wherein the obtaining of the nonce signature is limited based on the number of requests by the electronic device within a predetermined time.

12. The method of claim 1, further comprising:
storing, in a memory, a retry count of the user credential after an initial booting up of the electronic device is completed.

13. The method of claim 12, wherein the retry count of the user credential is maintained irrespective of another booting up of the electronic device.

14. An Appartus for performing a payment in an offline mode, the apparatus comprising:
a memory configured to store an authenticator and a secure application;
a communicator configured to obtain, via a network, a nonce signature generated based on a nonce token signed by a server; and
a processor configured to:
obtain a user credential from a user,
execute the secure application and the authenticator,
obtain the nonce token from the authenticator,
encrypt, at the secure application, the user credential using the nonce token and the nonce signature while disconnected from the network,
decrypt and validate, at the authenticator, the encrypted user credential,
generate a secure object based on the decrypted user credential and a random number generated by the authenticator, and
perform, while disconnected from the network, a secure payment based on the secure object.

15. The apparatus of claim 14, wherein the processor is further configured to validate, at the authenticator, the nonce token and the nonce signature.

16. The apparatus of claim 14, wherein the processor is further configured to:
launch a payment application in the offline mode,
obtain an one time password (OTP) of the payment application at the secure application,
obtain a second nonce token from the payment application, and
obtain, at the secure application, the secure object from the authenticator based on the second nonce token and a name of the authenticator,
wherein the performing of the secure payment comprises performing the secure payment based on the secure object and the OTP.

17. The apparatus of claim 16, wherein the secure object generated at the authenticator is only viewable at the payment application.

18. The apparatus of claim 14, wherein the generating of the secure object comprises:
generating the secure object based on the user credential, the random number and a user profile available in a payment application in the offline mode, and
wherein the performing of the secure payment comprises:
generating a payment code for a payee and executing the payment based on the payment code input into a device of the payee.

19. The apparatus of claim 14, wherein the random number remains the same when the user credential is changed.

20. The apparatus of claim 14, wherein the random number is generated when the user performs a first login to the secure application.

21. The apparatus of claim 14, wherein the random number is changed in response to an event comprising at least one of a factory reset event, a reset event by the user, a logout by the user, or a deletion of the secure object.

22. The apparatus of claim 14, wherein the user credential comprises at least one of user-setting password, fingerprint of the user, or an iris image of the user.

23. A non-transitory computer readable medium having a computer readable program stored therein, the computer readable program, when executed in a device, configured to execute instructions to cause the device to perform a method comprising:
launching, by an electronic device, a secure application;
obtaining a nonce token from an authenticator of the electronic device;
obtaining, via a network, a nonce signature generated based on the nonce token signed by a server;
encrypting, at the secure application, a user credential input by a user using the nonce token and the nonce signature while disconnected from the network;
decrypting and validating, at the authenticator, an encrypted user credential;
generating a secure object based on the decrypted user credential and a random number generated by the authenticator; and
performing, while disconnected from the network, a secure payment based on the secure object.

* * * * *